United States Patent Office 3,631,039
Patented Dec. 28, 1971

3,631,039
2-AMINO ETHYL-2-HYDROXY-6-VINYL TETRA-HYDROPYRANS, TAUTOMERS AND OPTICAL ENANTIOMERS THEREOF
David Andrews, Nutley, and Gabriel Saucy, Essex Fells, N.J., assignors to Hoffmann-La Roche Inc., Nutley, N.J.
No Drawing. Filed Apr. 21, 1969, Ser. No. 818,142
Int. Cl. C07d 87/32
U.S. Cl. 260—247.7 A    8 Claims

ABSTRACT OF THE DISCLOSURE

Multi-step processes for the preparation of tricyclic intermediates useful in the total synthesis of steroids are described. A first process step involves treatment of a dihydroxy, divinyl compound with both manganese dioxide and an amine to produce a Mannich base intermediate. The resulting Mannich base intermediate may be reduced catalytically and then coupled with a cyclic dione to yield a tricyclic keto diene. This compound can be reduced to yield a tricyclic hydroxy compound useful as an intermediate in the total synthesis of steroidal compounds having known valuable pharmacological properties. Alternatively, it is possible to directly couple the Mannich base with the cyclic diketo compound followed by reduction and catalytic hydrogenation to yield the tricyclic hydroxy compound.

BRIEF SUMMARY OF THE INVENTION

The present invention relates to processes for the preparation of compounds of the following formula:

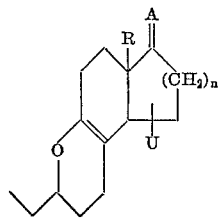

where A is

or

U is a single or double bond; R is lower alkyl and $n$ is 1 or 2.

In one preferred aspect of the present invention, compounds of Formula I where A is

and U is a double bond, e.g., compounds corresponding to the following formula:

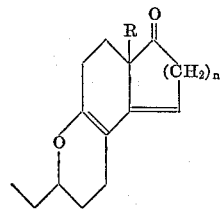

where R and $n$ are as above are prepared by reacting a Mannich base compound of the formula:

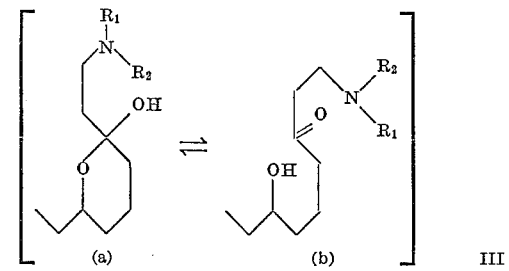

where $R_1$ taken independently is hydrogen or lower alkyl; $R_2$ taken independently is lower alkyl or aralkyl and $R_1$ and $R_2$ taken together with the adjacent nitrogen atom form a 5 or 6 membered saturated heterocyclic ring including at the most one further hetero atom selected from the group consisting of nitrogen and oxygen with a cyclic dione of the formula:

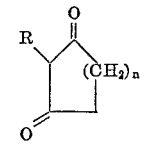

where R and $n$ are as above.

Examples of suitable cyclic diones of Formula IV include, for example 2-methyl-1,3-cyclopentanedione (R=methyl, $n=1$), 2-ethyl-1,3-cyclopentanedione (R=ethyl, $n=1$), 2-propyl-1,3-cyclopentanedione (R=propyl, $n=1$), 2-butyl-1,3-cyclopentanedione (R=butyl, $n=1$), 2-methyl-1,3-cyclohexanedione (R=methyl, $n=2$), etc.

The reaction between compounds of Formulas III and IV above is conveniently conducted in an inert organic solvent in the presence of an organic acid, e.g., acetic acid, and at a temperature in the range of from about 50° C. to the reflux temperature of the reaction medium, most preferably 80 to 120° C. Suitable inert organic solvents include, for example, aromatic hydrocarbons such as benzene, toluene and xylene; chlorinated aromatic hydrocarbons such as chlorobenzene or dichlorobenzene; nitrobenzene; tertiary alcohols such as t-butanol, etc. A most preferred solvent for this reaction is xylene.

Compounds of Formula III are readily prepared from compounds of the formula:

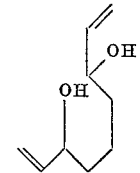

via a novel two-step procedure.

In the first reaction step the compound of Formula V, e.g., 3,7-dihydroxy-1,8-nonadiene, is reacted with a primary or secondary amine of the following formula:

where $R_1$ and $R_2$ are as above in the presence of manganese dioxide to unexpectedly yield an addition product wherein only one of the chemically equivalent vinyl groups has been substituted even in the presence of more than one mole of amine. The Mannich base products correspond to compounds of the following formula:

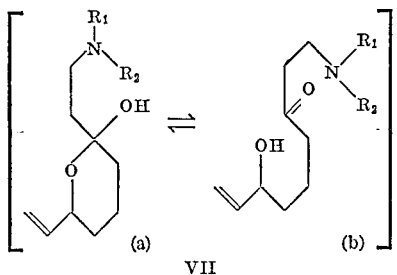

VII where $R_1$ and $R_2$ are as above
and the optical enantiomers thereof.

It should be noted that compounds of Formulas III and VII exist in solution in two tautomeric forms as indicated by sub-Formulas III(a), III(b), VII(a) and VII(b) respectively. The cyclic structures of Formulas III(a) and VII(a) are believed to be the lower energy form and thus are favored in the tautomeric equilibrium under most conditions. However, evidence for the existence of tautomeric Formulas III(b) and VII(b) are observed in the infrared wherein carbonyl stretching absorption peaks are in evidence. It is to be understood, however, that the absolute structure of the compounds of Formulas III and VII is not critical to the concept of the present invention.

The amines of Formula VI useful in the initial process step of this invention may be primary or secondary amines. Suitable primary amines include, for example, the lower alkyl amines such as methylamine, ethylamine, propylamine, n-butylamine, hexylamine, etc., preferably n-butyl amine; aralkylamines such as α-methylbenzylamine or amines of complex molecules such as, for example, dehydroabietylamine. The secondary amines most preferably include dilower alkylamines which may contain additional substituents on the alkyl groups, e.g., phenyl, or cyclic amines. Examples of dilower alkylamines include dimethylamine, diethylamine, methylethylamine, desoxyephedrine, with diethylamine being of greatest preference. Examples of cyclic amines include pyrrolidine and piperidine while morpholine is an example of a cyclic amine having an additional heterocyclic atom.

The process for the preparation of compounds of Formula VII is generally conducted at a temperature in the range of from about 0° to 75° C., most preferably in the range from about 25 to 45° C., it being understood that the reaction is slightly exothermic and the reaction temperature may be somewhat higher than the original mixing temperature. The reaction may be conducted in the presence of an added inert organic solvent such as, for example, an aliphatic hydrocarbon such as hexane; a chlorinated hydrocarbon such as, for example, dichloromethane or chlorobenzenes, e.g., chlorobenzene or dichlorobenzene; or an aromatic hydrocarbon such as benzene, toluene or xylene. The manganese dioxide used in this process is preferably an "active" grade which material is obtainable as an article of commerce.

The compounds of Formula VII may be catalytically hydrogenated, e.g., in the presence of metal catalysts such as palladium which may be supported on a conventional carrier, e.g., charcoal, calcium carbonate, barium sulfate, etc., to yield the compounds of Formula III above. This hydrogenation can be conducted in an inert organic solvent such as, for example, an aliphatic hydrocarbon such as hexane, aromatic hydrocarbons such as, for example, benzene, toluene or xylene, ethers such as tetrahydrofuran, or lower alkanols such as ethanol. Conventional hydrogenation conditions may be employed which include a pressure in the range of from about 0.5 to 50 atmospheres, most preferably in the range of from about 1 to 10 atmospheres, and a temperature in the range of from about 0 to 80° C., most preferably in the range from about 20 to 35° C.

In a further process aspect of the present invention compounds of Formula II above may be prepared by the selective catalytic hydrogenation of compounds of the following formula:

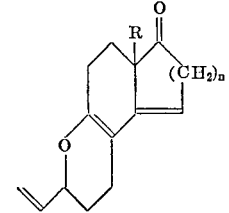

VIII where R and $n$ are as above
and the optical enantiomers thereof.

The selective catalytic hydrogenation is conducted using a supported palladium catalyst such as palladium on barium sulfate, calcium carbonate, charcoal, etc. It is also possible to utilize Raney nickel as catalyst in this reaction. Solvents useful with the palladium catalysts include inert organic solvents such as aliphatic hydrocarbons, e.g., hexane; or aromatic hydrocarbons, e.g., benzene, toluene or xylene; ethers such as tetrahydrofuran or lower alkanols such as ethanol or propanol. Lower alkanols are the solvents of preference with Raney nickel catalysts. The reaction may be conducted at a pressure in the range of from about 0.5 to 50 atmospheres, preferably 1 to 10 atmospheres, and a temperature in the range of about 0° to 80° C., preferably 20° to 35° C. The hydrogenation of the vinyl group will occur rapidly with the quick uptake of 1 mol equivalent of hydrogen. Hydrogenation of the remaining diene system will occur only very slowly under these conditions and the reaction can be conveniently stopped after hydrogenation of the vinyl group to yield the desired compounds of Formula II.

Compounds of Formula VIII above are readily obtained by the reaction of compounds of Formula IV with compounds of Formula VII above. This reaction can be conveniently conducted in an acid medium, e.g., acetic acid, and in the presence of an inert organic solvent, most preferably an aromatic hydrocarbon such as toluene, benzene or xylene. A most preferred solvent of this reaction is xylene. Conditions for this reaction include a temperature in the range from 60° C. to the reflux temperature of the reaction medium, with the reflux temperature being preferred.

Compounds of Formula I wherein A is

and U is a single bond may be prepared in a two-step procedure from compounds of Formula VIII above. The first step of this process involves reduction of the keto group to a hydroxy group utilizing a chemical reducing agent. Suitable chemical reducing agents for this purpose include metal hydrides, e.g., lithium aluminum hydride, diisobutyl aluminum hydride or sodium borohydride. The reaction can be conveniently conducted in an inert organic solvent such as an ether, e.g., tetrahydrofuran and at a temperature in the range of from about −70° to 60° C., most preferably in the range of from about −10° to 20° C. The reaction product corresponds to compounds of the following formula:

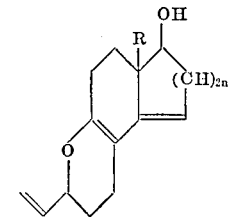

IX where R and $n$ are as above
and the optical enantiomers thereof.

Compounds of Formula IX may then be catalytically hydrogenated to yield the desired compounds of Formula I wherein A is

and U is a single bond, e.g., a compound corresponding to the following formula:

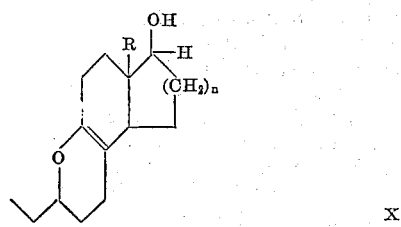

where R and $n$ are as above.

The catalytic hydrogenation of compounds of Formula IX is conducted in the presence of a catalyst metal, e.g., palladium, which may be supported on a conventional carrier, e.g., charcoal. The hydrogenation is preferably conducted in the presence of an inert organic solvent such as, for example, an aromatic hydrocarbon such as benzene, xylene or toluene, an ether such as tetrahydrofuran or a lower alkanol, e.g., ethanol or propanol. The reaction is conducted at a temperature in the range of from about 0 to 60° C., most preferably in the range from about 20 to 35° C. and a pressure in the range of from 0.5 to 50 atmospheres, most preferably in the range of from 1 to 10 atmospheres. Normal conditions are of highest preference.

In another process aspect of this invention compounds of Formula IX may be catalytically hydrogenated under the selective conditions employed for the transformation of compounds of Formula VIII to compounds of Formula II described above to yield compounds of Formula I wherein A is

and U is a double bond, that is compounds corresponding to the formula

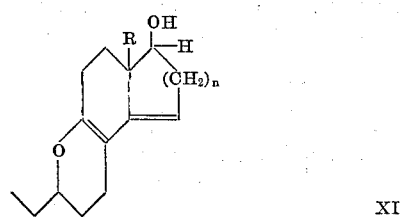

where R and $n$ are as above.

Compounds of Formula XI may also be obtained by reduction of compounds of Formula II using metal hydrides as per the description of the transformation of Formula VIII to Formula IX compounds previously described. Compounds of Formula XI may be catalytically hydrogenated to give compounds of Formula X by employing conditions previously described for the transformation of compounds of Formula IX to compounds of Formula X.

It is to be understood that the processes of the present invention are equally useful whether employing racemic mixtures or optical enantiomers of the respective compounds used in each process. For example, if compounds of Formula VII are resolved, such as by forming salts of optically active acids, e.g., camphorsulfonic acid or tartaric acid or where $R_1$ or $R_2$ is optically active by direct crystallization of the amine or acid addition salts thereof, e.g., the oxalic acid salt, and the (R) isomer is utilized in the preparation of compound VIII, it is found that the carbon bearing substituent R has the absolute configuration corresponding to the natural steroids.

It is evident to one skilled in the art that if optically active compounds of Formula VII are employed, then the succeeding intermediates prepared therefrom by use of the processes of this invention will also be obtained as optical enantiomers.

The foregoing reaction sequences may be more clearly illustrated by reference to the following reaction scheme:

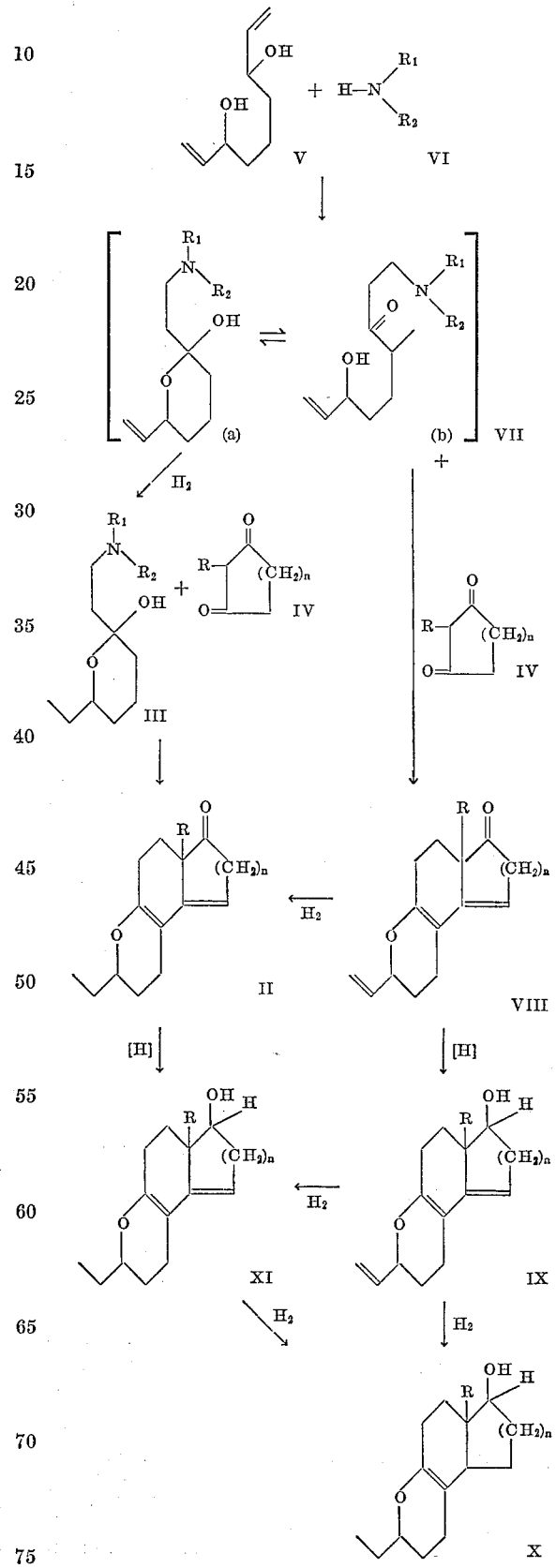

Intermediate compounds corresponding to Formulas VII, VIII and IX are novel compounds and are considered within the scope of the present invention. The products of the processes of the present invention, i.e., compounds of the Formulas II, X and XI which taken together represent generic Formula I, are intermediates known in the art to be useful in the preparation of steroids having valuable pharmaceutical properties. Thus, for example, the utilization of compounds of Formulas II, X and XI for this purpose is described in Belgian Patent No. 698,390, published Nov. 13, 1967.

As used herein the term "lower alkyl" is meant to include both straight and branched chain hydrocarbon groups of from 1 to 6 carbon atoms such as, for example, methyl, ethyl, propyl, isopropyl, butyl, isobutyl, secondary butyl, tertiary butyl, pentyl, hexyl and the like. When the term "lower alkyl" is used with reference to substituent R, it is meant to include straight chain hydrocarbon groups only.

The following examples further illustrate the present invention.

Example 1.—Preparation of 2-(2'-diethylaminoethyl)-2-hydroxy-6-vinyltetrahydropyran A total of 156.2 g. of 3,7-dihydroxy-1,8-nonadiene and 100 g. of diethylamine were dissolved in 2.5 l. of hexane and the solution was treated with activated manganese dioxide which was added to the solution portionwise. Addition of manganese dioxide was continued until thin layer chromatography indicated the reaction was complete. About 1000 g. of manganese dioxide was utilized. The temperature of the reaction medium rose spontaneously from about 25° C. to about 45° C. during the course of the reaction. Filtration and thorough washing of the solid with 3.0 l. of hexane resulted in the recovery of 95 percent of the manganese dioxide. The solvent was removed in vacuo from the filtrate and a residue comprising crude 2 - (2' - diethylaminoethyl)-2-hydroxy-6-vinyltetrahydropyran (209 g., 92 percent) was obtained. This material was of sufficient purity to be utilized in further reaction steps.

Purification of the product can be achieved by taking up the crude in hexane, extracting with dilute aqueous acid, separating and collecting the acid phase, neutralizing and back extracting with hexane.

The 3,7-dihydroxy-1,8-nonadiene may be prepared as follows:

Water was distilled under reduced pressure (60–100 mm. Hg) from commercial grade aqueous glutaraldehyde (4 kg. of 50 percent concentration) at 60–90° C. The resulting glutaraldehyde was then distilled at 20–22 mm. Hg and added immediately at 20° C. to a solution of vinyl magnesium chloride obtained from magnesium (1.2 kg.) and vinyl chloride (4.2 kg.) in 18 l. of tetrahydrofuran containing iodine and ethyl bromide in small proportions as catalysts. The reaction mixture was then treated with ammonium chloride and hydrochloric acid and the product extracted from the aqueous phase with tetrahydrofuran or methylene chloride. The residue remaining after removal of the solvent was distilled to obtain 3,7-dihydroxy-1,8-nonadiene in a yield of 2.162 kg. (75.3 percent) with a boiling point of 100–103° C./1. mm. Hg.

Example 2.—Preparation of 2-(2'-diethylaminoethyl)-2-hydroxy-6-ethyltetrahydropyran Crude 2 - (2'-diethylaminoethyl)-2-hydroxy-6-vinyltetrahydropyran (209 g.) prepared as in Example 1 above was dissolved in 1,500 ml. of hexane and after the addition of 1 g. of 10 percent of palladium on charcoal was stirred in a hydrogen atmosphere at 25–35° C. until hydrogen uptake at 0.5 to 2 atm. ceased (approximately 77–90 percent of theory). Filtration of the mixture removed the catalyst and the filtrate was concentrated in vacuo to leave a residue containing crude 2-(2'-diethylaminoethyl) - 2 - hydroxy-6-ethyltetrahydropyran which could be utilized without further purification in further steps.

Example 3.—Preparation of dl-3-vinyl-1,2,3,5,6,6a-hexahydro-6a-methylcyclopenta[f][1]benzopyran-7(8H)-one A solution containing 227 g. of 2-(2'-diethylaminoethyl)-2-hydroxy-6-vinyltetrahydropyran in 3.8 l. of xylene was treated with 112 g. of 2-methyl-1,3-cyclopentanedione and 1 l. of acetic acid. The reaction mixture was heated at reflux for 15 minutes. The acid was removed by extraction with water and dilute sodium bicarbonate solution. The organic phase was collected and the solvents removed in vacuo. Distillation of the residue at 121–124° C./0.6 mm. Hg and recrystallization of the distillate from hexane yielded the above-titled product as yellow needles (135 g., 58.7 percent). Further recrystallization from hexane yielded product having a melting point of 91.8–93.2° C.

Example 4.—Preparation of dl-3-ethyl-2,3,5,6,6a,8-hexahydro-6a-methylcyclopenta[f][1]benzopyran-7(8H)-one (a) A mixture containing 6.47 g. of 2-methyl-1,3-cyclopentanedione, 130 ml. of xylene and 65 ml. of glacial acetic acid was heated at reflux for 5 minutes. To the resulting solution was added during 15 minutes, 13.25 g. of 2 - (2' - diethylaminoethyl) - 2 - hydroxy - 6 - ethyltetrahydropyran in 65 ml. of xylene under reflux and a nitrogen atmosphere. The reaction mixture is heated at reflux for an additional 15 minutes. The resulting solution is cooled to 25° C. with an ice bath, then washed with 2× 100 ml. of water, 2× 100 ml. of saturated sodium bicarbonate and then with 1× 100 ml. of water. The aqueous solutions are extracted with 2× 200 ml. of benzene and the combined benzene and xylene solutions are concentrated in vacuo at 55° C. to yield brownish crystals as a residue. The residue is triturated with 50 ml. of hexane, the mixture filtered after 5 minutes and the solid washed with 2× 15 ml. of hexane to yield the above-captioned product as beige crystals melting at 101–102.5° C.

(b) A solution of 460 mg. of dl-3-vinyl-1,2,3,5,6,6a-hexahydro - 6a - methyl - cyclopenta[f][1]benzopyran-7(8H)-one in 10 ml. of toluene was selectively hydrogenated under normal conditions using 25 mg. of a 10 percent palladium on calcium carbonate catalyst. After 3 hours the uptake of hydrogen was 50 ml. The hydrogenation was then stopped, the catalyst was filtered off, washed with 2× 10 ml. of toluene and the solvent evaporated off from the combined toluene solution to give 425 mg. of dl-3-ethyl-2,3,5,6,6a,8-hexahydro-6a-methyl-cyclopenta[f][1]benzopyran-7(8H)-one as beige crystals, M.P. 101–104° C.

Example 5.—Preparation of 2-[2'-(1-pyrrolidyl)ethyl]-hydroxy-6-vinyltetrahydropyran Pyrrolidine (1.5 g.) and 3,7-dihydroxy-1,8-nonadiene (2.2 g.) in 40 ml. of xylene was treated with activated manganese dioxide (20 g.) as in Example 1. After 12 hours, the solution was filtered, the recovered manganese dioxide washed with 6× 50 ml. of dichloromethane and the combined solvents were evaporated to leave an almost theoretical yield of crude 2-[2'-(1-pyrrolidyl)-ethyl]-2-hydroxy-6-vinyltetrahydropyran which was suitable for use without further purification.

Example 6.—Preparation of 2-[2'-(1-piperidyl)ethyl]-2-hydroxy-6-vinyltetrahydropyran The procedure of Example 4 was repeated utilizing 1.5 g. of piperidine as the amine component. The product obtained in almost theoretical yield was crude 2-[2'-(1-piperidyl)ethyl] - 2 - hydroxy - 6 - vinyltetrahydropyran which was suitable for use without further purification.

Example 7.—Preparation of 2-[2'-(1-morpholino)ethyl]-2-hydroxy-6-vinyltetrahydropyran The procedure of Example 4 was repeated utilizing 1.5 g. of morpholine as the amine component. The product obtained in almost theoretical yield was crude 2-[2'-(1-morpholino)ethyl] - 2 - hydroxy - 6 - vinyltetrahydropyran which was suitable for use without further purification.

Example 8.—Preparation of 2-(2-n-butylaminoethyl)-2-hydroxy-6-vinyltetrahydropyran A solution containing 3.12 g. of 1,8-nonadiene-3,7-diol in benzene containing 3.0 g. of n-butylamine was treated with 40 g. of activated manganese dioxide and the mixture was stirred at 25–30° C. for 18 hours. The mixture was filtered and the manganese dioxide was washed thoroughly with benzene. The combined benzene filtrates were evaporated at 40° C. at 20 mm. Hg and then finally at 1 mm. Hg to yield crude product as a dark oil.

For purification the oil was taken up in ethyl acetate and with cooling was treated with 1.2 N hydrochloric acid. Extraction with 3 portions of ethyl acetate removed impurities. The aqueous phase was made basic (with cooling) using 10 N sodium hydroxide. Extraction with four portions of benzene, washing of the combined benzene extracts with saturated sodium chloride solution, drying over anhydrous sodium sulfate, filtration and evaporation as above yielded 4.80 g. of the above-titled product as an oil which was found to be uniform by thin layer chromatography.

EXAMPLE 9

The procedure of Example 3 was repeated utilizing the Mannich base products of Examples 5, 6, 7 and 8 and 2-methyl-1,3-cyclopentanedione to yield in all cases the desired dl - 3 - vinyl - 1,2,3,5,6,6a - hexahydro - 6a-methyl-cyclopenta[f][1]benzopyran-7(8H)-one.

Example 10.—Preparation of 2-(2'-(−)-α-phenylethylaminoethyl)-2-hydroxy-6-vinyltetrahydropyran (racemic)

A solution of 10.9 g. of 3,7-dihydroxy-1,8-nonadiene and 8.48 g. of (−)-α-phenylethylamine in 550 ml. of benzene was treated under vigorous stirring at 25° C. with 80 g. of activated manganese dioxide. After stirring for 60 hours, the manganese dioxide was filtered off and washed with 2× 100 ml. of benzene. After evaporation of the solvent, crude product was obtained which was purified by chromatography on 380 g. of alumina. Fractions (380 ml. each) were taken as follows: 1–3=pentane; 4–6=hexane; 7–9=hexane/ether (9:1); 10–12=hexane/ether (4:1); 13–15=hexane/ether (1:1) and 16–18=ether. Fractions 9–12 were shown to be pure above-titled product, combined yield 3.14 g. after removal of solvent.

Example 11.—Resolution of 2-(2'-(−)-α-phenylethylaminoethyl)-2-hydroxy-6-vinyltetrahydropyran as the oxalate salt To a solution of 826 mg. of purified 2-(2'-(−)-α-phenylethylaminoethyl)-2-hydroxy-2-vinyltetrahydropyran in 16 ml. of dioxane there was added a solution of 273 mg. of 99.0 percent anhydrous oxalic acid powder. After standing at 25° C. for one week the precipitated white crystals were filtered off and washed with dioxane (2× 3 ml.). There was obtained 243 mg. of the oxalate of the negative rotating enantiomer of 2-(2'-(−)-α-phenylethylaminoethyl)-2-hydroxy - 6 - vinyltetrahydropyran; M.P. 119–124° C., $[\alpha]_D^{25}=-24.5°$ (c.=1.0, methanol).

Use of acetone instead of dioxane yielded 389 mg. of the oxalate, M.P. 119–124° C., $[\alpha]_D^{25}=-24.2°$ (c.=1.0, methanol).

Example 12.—Preparation of (−)-3-vinyl-1,2,3,5,6,6a-hexahydro- - 6a - methylcyclopenta[f][1]benzopyran-7-(8H)-one A mixture of 207 mg. of 2-methyl-1,3-cyclopentanedione, 9.0 ml. of xylene and 2.3 ml. of glacial acetic acid was refluxed under nitrogen for 2 minutes. Then 592 mg. of the resolved oxalate salt prepared by the method of Example 11 was added and the mixture refluxed for ½ hour. The solution was then washed with 2× 5 ml. water, 2× 5 ml. saturated sodium bicarbonate solution and 1× 5 ml. water. The combined aqueous phases were extracted with 2× 20 ml. of benzene. The combined xylene and benzene solutions were evaporated and the residue (330 mg.) was purified by passing it through a column containing 16.5 g. of alumina. Fractions of 16.5 ml. each were taken as follows: 1–10=hexane, 11–13=hexane/ether (19:1) and 14–6=hexane/ether (9:1). This layer chromatography analysis showed fractions 7–11 (42.8 mg. after evaporation) to be pure (−)-3-vinyl-1,2,3,5,6, 6a-hexahydro - 6a - methyl-cyclopenta[f][1]benzopyran-7(8H)-one, $[\alpha]_D^{25}=-85.0°$ (c.=1.0, chloroform).

Example 13.—Preparation of (−)-3-ethyl-1,2,3,5,6,6a-hexahydro - 6a - methylcyclopenta[f][1]benzopyran-7(8H)-one A total of 132 mg. of (−)-3-vinyl-1,2,3,5,6,6a-hexahydro - 6a - methyl-cyclopenta[f][1]benzopyran-7(8H)-one in 4.0 ml. of toluene was selectively hydrogenated under normal conditions using 25 mg. of a 10 percent palladium on barium sulfate catalyst. The hydrogenation was stopped after an uptake of 16 ml. of hydrogen. After the catalyst was filtered off and the solvent evaporated, 110 mg. of crude product was obtained as a residue which was then purified by chromatography on 5.5 g. of alumina. A series of 5.5 ml. fractions were taken as follows: 1–10=hexane and 11–13=hexane/ether (19:1). Thin layer chromatography analysis showed fractions 3–10 (75.2 mg. after evaporation of solvent) to be (−)-ethyl-1,2,3,5,6,6a-hexahydro - 6a - methylcyclopenta[f][1]benzopyran-7(8H)-one, $[\alpha]_D^{25}=-118.8°$ (c.=1.0, chloroform). Recrystallization from pentane/hexane (1:1) yielded 35.5 mg. of crystalline product, M.P. 98–101° C., $[\alpha]_D^{25}=-123.8°$ (c.=1.0, chloroform).

Example 14.—Preparation of dl-3-vinyl-1,2,3,5,6,6a,7,8-octahydro - 6a - methylcyclopenta[f][1]benzopyran-7-ol A total of 20 g. of dl-3-vinyl-1,2,3,5,6,6a-hexahydro-6a-methyl-cyclopenta[f][1]benzopyran - 7(8H)-one dissolved in 200 ml. of tetrahydrofuran was added to a suspension of lithium aluminum hydride (2 g.) in tetrahydrofuran (200 ml.) at 0° C. After one hour a total of 24 ml. of water was added and the solution filtered. Evaporation of the solvent and recrystallization of the residue from hexane yielded the above-titled product melting at 110–112° C.

Example 15.—Preparation of dl-1,2,3,5,6,6a,7,8,9,9a decahydro - 3 - ethyl-6a-methyl-cyclopenta[f][1]benzopyran-7-ol (a) Crude dl-3-vinyl - 1,2,3,5,6,6a,7,8 - octahydro-6a-methylcyclopenta[f][1]benzopyran-7-ol (41.4 g.) in 400 ml. of toluene was hydrogenated at normal conditions in the presence of 4 g. of 10 percent of palladium on charcoal catalyst. After absorption of hydrogen ceased (slightly less than theoretical amount taken up) the solution was filtered free from the catalyst and the product was recovered by evaporation of the solvent to yield 41 g. of crude dl - 1,2,3,5,6,6a,7,8,9,9a-decahydro - 3 - ethyl-6a-methyl-cyclopenta[f][1]benzopyran-7-ol as an oil which is suitable for use in further transformations without purification.

(b) A mixture containing 3-ethyl-1,2,3,5,5,6,6a,7,8- octahydro - 6a - methyl-cyclopenta[f][1]benzopyran-7-ol, 160 ml. of methanol, 1.6 ml. of 3 N sodium hydroxide and 0.8 g. of 5 percent palladium on charcoal is stirred at room temperature under a hydrogen atmosphere. The uptake of hydrogen stopped after 2 hours during which time 520 ml. of hydrogen was taken up. After addition of 0.3 ml. of acetic acid, the catalyst is filtered off and the filtrate evaporated to dryness to yield 4.9 g. of dl-1,2,3,5, 6,6a,7,8,9,9a-decahydro - 3 - ethyl-6a-methyl-cyclopenta [f][1]benzopyran-7-ol.

Example 16.—Preparation of 2-[methyl-(1-methyl-2-phenylethyl)aminoethyl]-2-hydroxy-6-vinyltetrahydropyran A mixture of 3,7-dihydroxy-1,8-nonadiene (15.6 g., 0.1 m.), d-1-phenyl-2-methylaminopropane (14.9 g., 0.1 m.) and active manganese dioxide (120 g.) was suspended in toluene (200 ml.) with stirring and the temperature rose from 22° C. to 41° C. After 3 days no dihydroxynonadiene could be detected by thin layer chromatography. The reaction mixture was filtered and the manganese dioxide was washed with toluene (300 ml.). The product was extracted from the toluene solutions with 300 ml. of hydrochloric acid (1 N) and recovered from the acid by the addition of 15 percent aqueous sodium hydroxide solution (250 ml.) and hexane (100 ml.). Separation of the hexane layer and distillation of the hexane left the above-titled product (20.5 g.) as a light brown oil.

Example 17.—Preparation of 3-ethyl-1,2,3,5,6,6a,7,8-octahydro-6a-methylcyclopenta[f][1]benzopyran-7-ol A solution of 1 g. of 3-ethyl-1,2,3,5,6,6a,7,8-octahydro-6a-methyl-cyclopenta[f][1]benzopyran - 7(8H) - one in 20 ml. of tetrahydrofuran is added during 15 minutes to a stirred mixture of 100 mg. of lithium aluminum hydride in 25 ml. of tetrahydrofuran maintained at 0° C. and under an atmosphere of nitrogen. After an additional hour of stirring at 0° C., the mixture is added to a concentrated sodium hydroxide solution. The resulting solution is filtered and evaporated to yield 982 mg. of 3-ethyl-1,2,3,5,6,-6a,7,8 - octahydro - 6a - methyl - cyclopenta[f][1[benzo-pyran-7-ol, M.P. 107–109° C.

We claim:
1. A compound of the formula

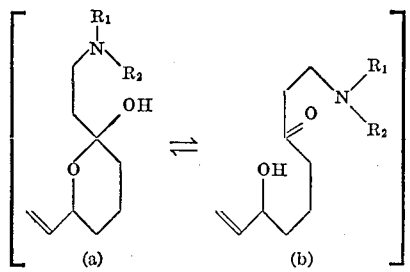

wherein $R_1$ taken independently is hydrogen or lower alkyl; $R_2$ taken independently is lower alkyl or aralkyl and $R_1$ and $R_2$ taken together with the adjacent nitrogen atom form a 5 or 6 membered saturated heterocyclic ring including at the most one further hetero atom selected from the group consisting of nitrogen and oxygen and the optical enantiomers thereof.

2. The compound of claim 1 which is 2-(2'-diethylaminoethyl)-2-hydroxy-6-vinyltetrahydropyran.

3. The compound of claim 1 which is 2-[2'-(1-piperidyl)-ethyl]-2-hydroxy-6-vinyltetrahydropyran.

4. The compound of claim 1 which is 2-[2'-(1-pyrrolidyl)-ethyl]-2-hydroxy-6-vinyltetrahydropyran.

5. The compound of claim 1 which is 2-[2'-(1-morpholino)-ethyl]-2-hydroxy-6-vinyltetrahydropyran.

6. The compound of claim 1 which is 2-[methyl-(1-methyl - 2 - phenylethyl)aminoethyl] - 2 - hydroxy - 6-vinyltetrahydropyran.

7. The compound of claim 1 which is 2-(2'-α-phenylethylaminoethyl)-2-hydroxy-6-vinyltetrahydropyran.

8. The compound of claim 1 which is 2-(2-n-butylaminoethyl)-2-hydroxy-6-vinyltetrahydropyran.

No references cited.

ALEX MAZEL, Primary Examiner

J. TOVAR, Assistant Examiner

U.S. Cl. X.R.

260—294.7D, 326.5D, 345.2, 345.9, 584A; 424—248